J. H. CAHILL.
Range.
No. 11,516.
Patented Aug. 15, 1854.
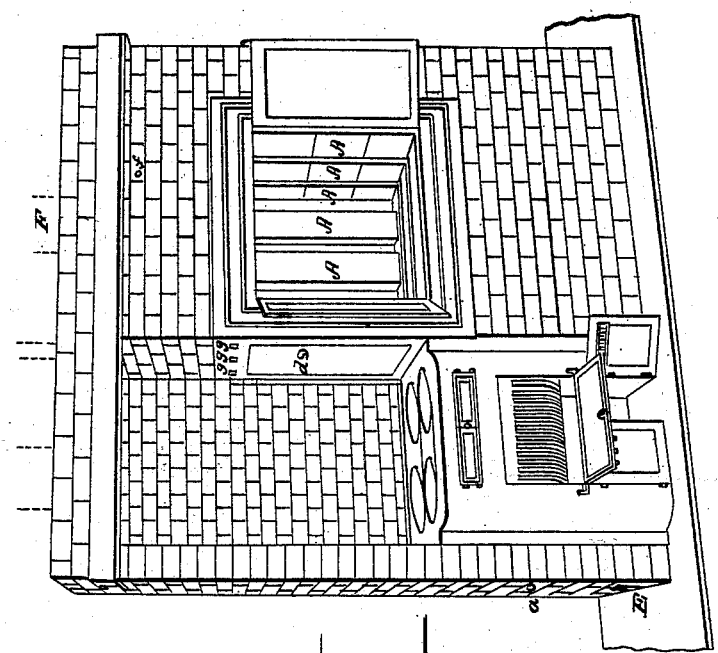
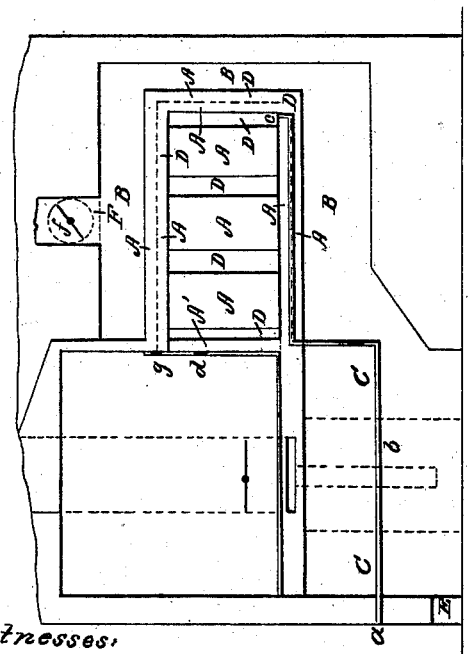
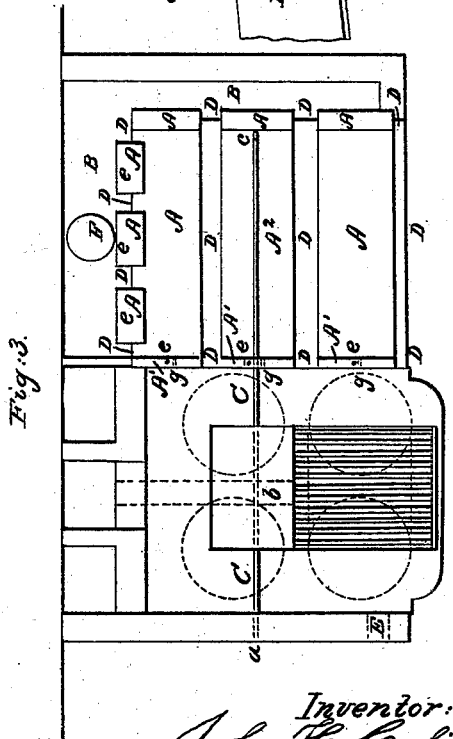
Witnesses:
Benj Morison
Geo G Geyer
Inventor:
John H Cahill

UNITED STATES PATENT OFFICE.

JOHN H. CAHILL, OF PHILADELPHIA, PENNSYLVANIA.

HOT-AIR RANGE AND SIDE OVEN.

Specification of Letters Patent No. 11,516, dated August 15, 1854.

*To all whom it may concern:*

Be it known that I, JOHN H. CAHILL, of the city of Philadelphia and State of Pennsylvania, have invented a new and useful Improvement on the Hot-Air Range and Elevated Side Oven; and I do hereby declare that the following is a full, clear, and exact description of the construction and operation of the same, reference being had to the annexed drawings, making a part of this specification, in which—

Figure 1, is a perspective view, Fig. 2, a vertical section, and Fig. 3, a sectional plan view—like parts in the several figures being indicated by the same letters.

The nature of my improvement consists in a peculiar mode of constructing and arranging the heating flues on four sides of the oven, so as to serve the double purpose of heating the oven and the hot air chamber at the same time, and also in a peculiar mode of heating and conducting a stream of fresh hot air into the oven.

A, A, are the flues, twelve of which are constructed and arranged so as to radiate heat within the oven and also at the same time, within the hot air chamber B. The three flues $A^1$, being on the side next to the range are intended to radiate heat within the oven only.

C, is the pipe for conducting fresh air into the oven. It passes from the outside of the jamb (at $a$) along close behind the fire box ($b$) to a point in the hot air chamber (B) directly below the middle vertical flue $A^1$, thence upward to the middle of the central horizontal flue ($A^2$) and along the middle of said flue to a point near its other end, where it turns upward and opens into the oven (at $c$.) Through the side of the oven next to the fire or range, a small vent hole ($d$) is made, which can be closed or opened as occasion may require. The flues which radiate heat within the oven and hot air chamber are each made square or oblong, and are connected together by partitions, or plates of metal (D) which with the outer surfaces of the flues form a continuous partition, or division between the hot air chamber (B) and the oven. The three flues at the back of the oven, and also the three on the side next to the range, are called "dumb flues," being closed at their upper ends—their lower ends being open for the entrance of hot air and gas from the fire box—and in order to cause a more rapid passage of the hot air and gas into them, I usually make a small vent hole ($e$) through their upper ends. The fire box, grate, ash flue and direct flue; as also the general arrangement of the hot air chamber, in relation to the range and oven, are the same as in other "hot air ranges with elevated side ovens," and being clearly shown in the drawings, need no further description. The hot air chamber is supplied with air through the opening in the jamb at E, and as the air passes around, it is heated by radiation from the flues in the four sides of the oven, and enters the hot air flue (F) in which there is a valve ($f$) for regulating its escape upward, as usual.

$g, g, g$, are "clean out" holes (with stoppers) for removing the dust, &c., from the upper horizontal flues. I usually make the flues of cast iron, bolted and cemented together. The fresh air pipe (C) I usually make of sheet iron, round, and about two inches in diameter.

I do not claim as my invention, passing fresh hot air into an oven—nor radiating flues applied to a range with an elevated side oven independently of their peculiar mode of construction and arrangement—but what I claim as my invention and desire to secure by Letters Patent is—

1. I claim the use of the fresh hot air pipe when constructed and combined with the hot air chamber and elevated side oven and vent hole, especially for the purpose of preventing the fumes or vapors (arising from the substances being cooked in the oven when in operation) from being drawn or forced out of the oven into the hot air chamber as described.

2. I claim making the elevated side oven flues of square section, and united together by the partitions as described, so as to leave equal and flat surfaces in the oven and hot air chamber, and arranged so as to radiate heat therefrom, on all sides of the oven, excepting the door side; and also so as to radiate heat into the hot air chamber from the flues on four sides of the oven, substantially as described.

JOHN H. CAHILL.

Witnesses:
BENJ. MORRISON,
GEO. C. GEYER.